J. E. WARD.
PIPE COUPLING.
APPLICATION FILED AUG. 1, 1910.
997,874.
Patented July 11, 1911.
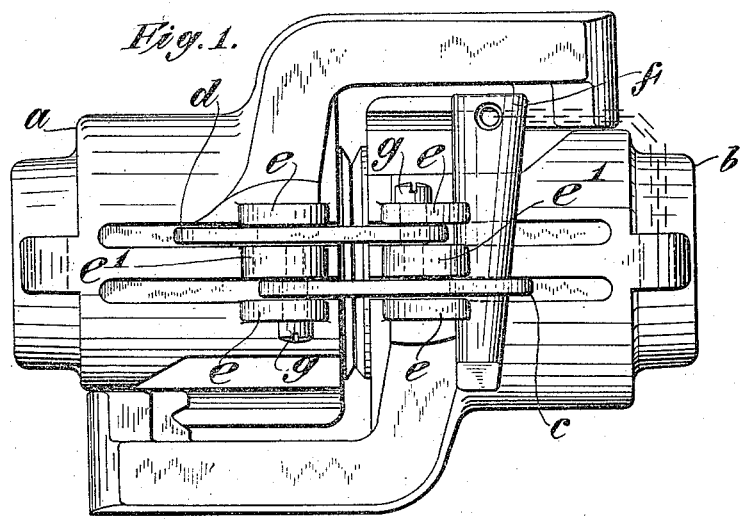
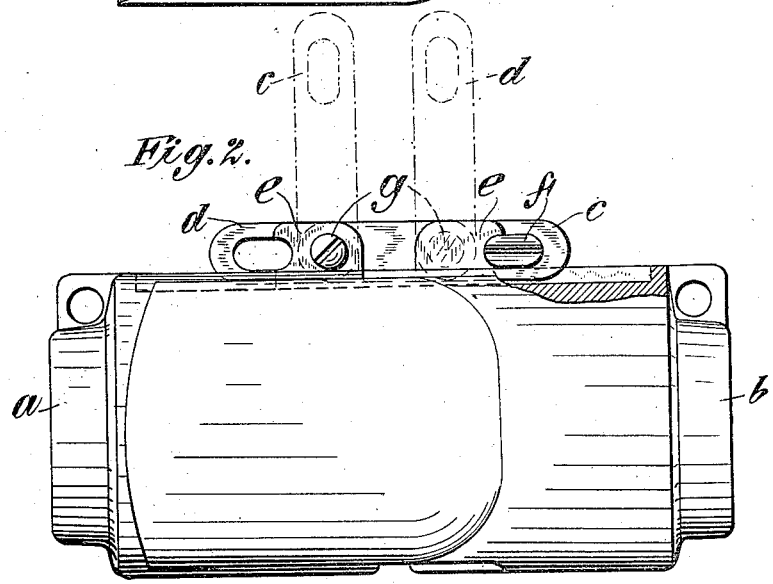
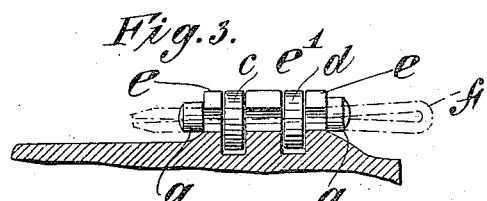
Witnesses:
Inventor
John E. Ward
By his Attorneys
Kiddle & Wendell

UNITED STATES PATENT OFFICE.

JOHN E. WARD, OF NEW YORK, N. Y., ASSIGNOR TO WARD EQUIPMENT COMPANY, OF NEW YORK, N. Y., A CORPORATION OF NEW YORK.

PIPE-COUPLING.

997,874.

Specification of Letters Patent.   Patented July 11, 1911.

Application filed August 1, 1910.   Serial No. 575,041.

*To all whom it may concern:*

Be it known that I, JOHN E. WARD, a citizen of the United States, and a resident of the borough of Manhattan, of the city of New York, in the county and State of New York, have made certain new and useful Improvements in Pipe-Couplings, of which the following is a specification.

The invention relates more particularly to locking devices for pipe couplings, such locking devices being provided for the purpose of securely holding together the two members of the coupling and preventing them from becoming wrenched or shaken out of the proper coupling position when in use. Devices for this purpose have been provided heretofore but have proved unsatisfactory from one cause or another.

The present device is designed with the ends in view; of locating the locking parts out of the way of the coupling; of producing a positive locking of the two members; of causing the forces which are transmitted through and to the locking parts to act in such manner that the parts will be less liable to break; of advantageously applying and distributing the forces when the locking parts are being brought to locking position and also when holding the coupling members in proper locked position; and of so applying the forces acting on the parts as will more advantageously effect the holding of the coupling members together than in devices heretofore used.

The objects above enumerated are attained in the locking device for pipe couplings embodying my invention and I have illustrated such devices as applied to a standard form of pipe coupling in the accompanying drawing forming a part of this specification, and in which drawing;

Figure 1 represents a plan view of the coupling with the members thereof in coupling position and held therein by my improved locking means. Fig. 2 is a side view of the form shown in Fig. 1 partly in section, with the pivoted links of the locking means indicated by dotted lines out of locking position. Fig. 3 is a partial sectional view of one of the coupling members taken at one side of the end of the link showing the ends of the same and the projections carried by the coupling members, the position of the key for holding the links in proper position being indicated by dotted lines.

It will be unnecessary to describe the standard form of coupling shown in the drawings and hence reference may be made immediately to the locking device which is the subject of the present invention.

Referring to Figs. 1 and 2, it will be seen that the two heads $a$ and $b$ of the coupling are provided respectively with arms or links $c$ and $d$ which are pivoted thereto so as to be movable in the plane of the coupling. On the coupling heads there are lugs between which and the free ends of the links a wedging member, namely, the key wedge $f$, can move so as to force the link engaged by the wedging member longitudinally and thereby cause relative longitudinal movement between the lug and link to force and hold the coupling heads together. The lugs also serve as means upon which the link members can be pivotally mounted and it will be noticed that the lug $e^1$ on each of the coupling heads serves the dual function of a means upon which one of the links can be pivotally mounted and also a means with which the key wedge above referred to can engage to draw a second link longitudinally and toward the lugs. The links $c$ and $d$ are connected to the lugs, $e$ and $e^1$, of the respective heads $a$ and $b$ by means of the pins $g$. In Fig. 3 it is shown how the coupling heads $a$ and $b$ are recessed in order to decrease the distance that the links project beyond the body or head.

It is obvious that various modifications may be made without departing from the spirit and scope of my invention.

I claim as my invention:—

1. In a pipe coupling the combination of companion heads one of which carries a pivoted link provided with wedge engaging portions at the free end thereof, the second or companion coupling head having a slotted portion into which the free end of the above link can enter which said second head is provided with lugs having wedge engaging portions that terminate adjacent to the body portion of the coupling head whereby when the wedge member is in place it lies transversely but adjacent to the body of said head.

2. In a pipe coupling the combination of companion heads each head carrying three lugs between two of which on each head a link is pivotally mounted and between two of which on each head the free end of the link thus pivotally mounted on the companion head can enter, the lugs on each head and the free ends of the links having bearing surfaces between which a wedge can enter and operate to hold the link with which it is in engagement in coupling holding position.

This specification signed and witnessed this 29th day of July, A. D., 1910.

JOHN E. WARD.

Signed in the presence of—
G. McGRANN,
EDWIN A. PACKARD.